United States Patent
Drahm et al.

(10) Patent No.: US 7,040,179 B2
(45) Date of Patent: May 9, 2006

(54) PROCESS METER

(75) Inventors: Wolfgang Drahm, Erding (DE); Alfred Rieder, Landshut (DE)

(73) Assignee: Endress+ Hauser Flowtec AG, Reinach (CH)

( * ) Notice: Subject to any disclaimer, the term of this patent is extended or adjusted under 35 U.S.C. 154(b) by 51 days.

(21) Appl. No.: 10/729,370

(22) Filed: Dec. 8, 2003

(65) Prior Publication Data

US 2004/0187599 A1   Sep. 30, 2004

Related U.S. Application Data (60) Provisional application No. 60/432,658, filed on Dec. 12, 2002.

(30) Foreign Application Priority Data

Dec. 6, 2002   (DE) ................................ 102 57 322

(51) Int. Cl.
*G01F 1/84* (2006.01)
(52) U.S. Cl. ................................. 73/861.356
(58) Field of Classification Search ........... 73/861.356, 73/861.354, 861.355, 861.357, 45, 49, 50, 73/130, 136, 140; 702/50, 130, 136, 140
See application file for complete search history.

(56) References Cited

U.S. PATENT DOCUMENTS

| | | | |
|---|---|---|---|
| 5,343,737 A | | 9/1994 | Baumoel |
| 5,469,748 A | | 11/1995 | Kalotay |
| 5,796,012 A | * | 8/1998 | Gomi et al. ........... 73/861.357 |
| 6,311,136 B1 | * | 10/2001 | Henry et al. .................. 702/45 |
| 6,505,135 B1 | * | 1/2003 | Maginnis ..................... 702/100 |

FOREIGN PATENT DOCUMENTS

| | | |
|---|---|---|
| DE | 195 37 880 A1 | 4/1996 |
| DE | 100 32 015 A1 | 1/2002 |
| EP | 0 759 541 A1 | 2/1997 |
| EP | 0 831 306 A1 | 3/1998 |
| WO | WO 88/02476 | 4/1988 |
| WO | WO 00/36379 | 6/2000 |

\* cited by examiner

*Primary Examiner*—Harshad Patel
*Assistant Examiner*—Corey D. Mack
(74) *Attorney, Agent, or Firm*—Bacon & Thomas (57) ABSTRACT

A process meter for measuring at least one physical process variable of a medium stored in a container or flowing in a line, comprising: a transducer including a sensor arrangement providing measurement signals ($s_1$, $s_2$), said sensor arrangement having: at least a first sensor providing at least a first measurement signal ($s_1$) in response to the physical process variable being measured, particularly to changes in the process variable, and at least a first temperature sensor mounted in said transducer for locally sensing a first temperature, $T_1$, in the transducer, and by means of said at least one temperature sensor, at least a first temperature measurement signal ($\Theta_1$) representing the first temperature, $T_1$, in said transducer; and meter electronics which, using at least said first measurement signal ($s_1$) and a first correction value ($K_1$) for the at least first measurement signal ($s_1$), derive at least one measured value (X) currently representing the physical variable, wherein: during operation, said meter electronics determine the first correction value ($K_1$) from a temporal variation of the at least first temperature measurement signal ($\Theta_1$) by also taking into account temperature values sensed in the past by means of said first temperature sensor.

30 Claims, 7 Drawing Sheets

PROCESS METER

CROSS-REFERENCE TO RELATED APPLICATION

This application is a non-provisional application of provisional application No. 60/432,658, filed Dec. 12, 2002.

FIELD OF THE INVENTION

This invention relates to a process meter for measuring at least one physical process variable, particularly a mass flow rate, density, viscosity, pressure, or the like, of a medium stored in a process container or flowing in a process line.

BACKGROUND OF THE INVENTION

In industrial process measurement technology, particularly in connection with the automation of chemical or other industrial processes, analog or digital measured-value signals representative of process variables are generated using process meters installed on site, i.e., close to the process, so-called field meters. Examples of such process meters, which are familiar to those skilled in the art, are described in detail in EP-A 984 248, EP-A 1 158 289, U.S. Pat. No. 3,878,725, U.S. Pat. No. 4,308,754, U.S. Pat. No. 4,468,971, U.S. Pat. No. 4,524,610, U.S. Pat. No. 4,574,328, U.S. Pat. No. 4,594,584, U.S. Pat. No. 4,617,607, U.S. Pat. No. 4,716,770, U.S. Pat. No. 4,768,384, U.S. Pat. No. 4,850,213, U.S. Pat. No. 5,052,230, U.S. Pat. No. 5,131,279, U.S. Pat. No. 5,231,884, U.S. Pat. No. 5,359,881, U.S. Pat. No. 5,363,341, U.S. Pat. No. 5,469,748, U.S. Pat. No. 5,604,685, U.S. Pat. No. 5,687,100, U.S. Pat. No. 5,796,011, U.S. Pat. No. 6,006,609, U.S. Pat. No. 6,236,322, U.S. Pat. No. 6,352,000, U.S. Pat. No. 6,397,683, WO-A 88/02476, WO-A 88/02853, WO-A 95/16897, WO-A 00/36379, WO-A 00/14485, WO-A 01/02816, or WO-A 02/086426.

The respective process variables to be sensed may be, for instance, a mass flow rate, density, viscosity, a filling or threshold level, pressure, temperature, or the like of a liquid, powdery, vaporous, or gaseous process medium which is conducted or stored in a suitable process vessel, such as a pipe or tank.

To sense the respective process variables, the process meter comprises a suitable, generally physical-to-electrical, transducer which is mounted in a wall of the process-medium-storing container or connected into a process-medium-conducting line, and which provides at least one, particularly electric, measurement signal representing the sensed process variable as accurately as possible. The transducer is connected to suitable meter electronics, particularly to electronics designed to process or evaluate the at least one measurement signal.

Via a data transmission system coupled to the meter electronics, process meters of the kind described are linked together and/or to process control computers, where they send the measurement signal via (4- to 20-mA) current loops and/or digital data buses, for example. For the data transmission systems, Fieldbus systems, particularly serial systems, such as PROFIBUS-PA, FOUNDATION FIELDBUS, and the corresponding communications protocols are used. By means of the process control computers, the transmitted measurement signals can be further processed and visualized as corresponding measurement results, e.g. on monitors, and/or converted to control signals for process control elements, such as solenoid valves, electric motors, etc.

To house the meter electronics, process meters of the kind described comprise an electronics case which, as proposed in U.S. Pat. No. 6,397,683 or WO-A 00/36379, for example, may be located at a distance from the field meter and be connected to the latter by a cord, or which, as also shown in EP-A 903 651 or EP-A 1 008 836, for example, is disposed directly at the transducer or at a case that houses the transducer. Frequently, the electronics case, as shown in EP-A 984 248, U.S. Pat. No. 4,594,584, U.S. Pat. No. 4,716,770, or U.S. Pat. No. 6,352,000, for example, also houses some mechanical components of the transducer, such as diaphragm-, rod-, sleeve-shaped or tubular bodies which deform or vibrate under mechanical action.

Particularly in EP-A 1 158 289, U.S. Pat. No. 4,768,384, U.S. Pat. No. 5,359,881, U.S. Pat. No. 5,687,100, WO-A 88/02476, WO-A 95/16897, or WO-A 01/02816, process meters for measuring at least one physical process variable, particularly a mass flow rate, density, viscosity, pressure, or the like, of a medium flowing in a process line are shown in which the respective transducers comprise:

at least one flow tube for conducting the, particularly flowing, medium;

an excitation assembly electrically connected to the meter electronics and comprising a, particularly electrodynamic or electromagnetic, vibration exciter for driving the flow tube; and a sensor arrangement comprising at least a first sensor and a second sensor which respond to the physical process variable, particularly to changes therein, and provide at least a first measurement signal and a second measurement signal in response to the physical process variable, wherein the meter electronics provide at least one excitation signal for controlling the vibration exciter, so that in operation, the flow tube is vibrated at least intermittently, wherein the two sensors respond to inlet-side and outlet-side vibrations of the flow tube, respectively, and wherein the measurement signals provided by the sensors represent mechanical vibrations of the vibrating flow tube which are influenced by the process medium.

Moreover, such a vibratory process meter comprises a transducer case which encloses the flow tube along with the vibration exciters and sensors mounted thereon as well as any further components of the transducer.

If the vibratory process meter is used as a Coriolis mass flowmeter, the meter electronics determine, among other quantities, a phase difference between the two measurement signals from the sensors, here vibration signals, and provides at its output a measured-value signal which, corresponding to the temporal variation of the phase difference, represents a measured value of the mass flow rate.

As is well known, aside from the above-described process variables to be sensed, other physical quantities, particularly quantities that cannot be influenced, such as a process temperature or a process-medium temperature, may act on process meters of the kind described, particularly on their respective transducers.

Especially in process meters using vibrating flow tubes, for instance in Coriolis mass flowmeters, densimeters, and/or viscometers, thermal expansion of the flow tube may result in the transducer exhibiting, aside from a sensitivity to the primary measurands, such as flow rate, density, and/or viscosity, an unwanted sensitivity to an instantaneous temperature distribution in the transducer. Due to such spurious temperature effects on the oscillatory response of the transducer, the latter is "detuned". Accordingly, if this "detuning"

is not taken into account, the measured-value signal provided by the meter electronics may be erroneous.

To compensate for spurious temperature effects on the measurement signals provided by the transducer and/or on measured-value signals derived therefrom by the meter electronics, Coriolis mass flowmeters or Coriolis mass flowmeter-densimeters generally include at least one temperature sensor, for instance a sensor for measuring the temperature or ambient temperature of the flow tube, compare U.S. Pat. No. 5,359,881, U.S. Pat. No. 5,687,100, or WO-A 88/02476.

In the process meters shown therein, in order to compensate for effects of temperature on the elasticity moduli of the respective flow tubes, an electric temperature measurement signal corresponding to the temperature of the medium being measured is produced by means of a temperature sensor mounted on a curved flow tube, for instance a Pt100 or Pt1000 element or a thermocouple. This temperature measurement signal is then multiplied in the meter electronics by constant, time-invariant coefficients to obtain a correction factor taking into account the influences of the measured temperature on the modulus of elasticity, and thus incorporated in the correction of the measured-value signal, e.g. a mass flow rate signal and/or a density signal. To smooth the temperature measurement signal or improve its signal-to-noise ratio, suitable digital signal filters may be employed, as proposed in WO-A 88/02476, for example.

Aside from such vibratory process meters with curved flow tube, vibratory process meters with a single straight flow tube or with two flow tubes are known to those skilled in the art, compare especially U.S. Pat. No. 4,524,610, U.S. Pat. No. 4,768,384, U.S. Pat. No. 6,006,609, WO-A 00/14485, or WO-A 01/02816. In such process meters with a single straight flow tube, a supporting element fixed to the flow tube, particularly an element mounted in the transducer case so as to be capable of vibratory motion, is provided in the transducer for supporting the vibration exciter and the sensors. The supporting element also serves to vibration-isolate the vibrating flow tube from the connected pipe. It may be designed as a tubular compensation cylinder coaxial with the flow tube, or as a box-shaped support frame.

Because of their specific design, vibratory process meters with straight flow tube(s) respond to temperature changes not only with the aforementioned change in modulus of elasticity, but temperature-induced changes in mechanical stresses within the flow tube and within the supporting element and/or the transducer case also cause changes in the transducer's sensitivity to the primary process variables.

Such thermal stresses, particularly stresses acting along the axis of the flow tube, may have various causes, which may occur alone or in combination. Even if the flow tube and the supporting element or the transducer case are virtually at the same temperature, thermal stresses may occur if the supporting tube and the vibrating system are made of different materials with different coefficients of thermal expansion. Such effects of temperature on the measurement result are even stronger if the temperature of the flow tube is different from the temperature of the supporting tube. That is the case particularly if a process medium is to be measured whose temperature differs from the ambient temperature. In the case of very hot or very cold process media, a very high temperature gradient may exist between the supporting element or the transducer case and the flow tubes.

Measures to compensate for such temperature effects, which change the transducer's sensitivity to the primary process variables, are described, for example, in U.S. Pat. No. 4,768,384, U.S. Pat. No. 5,231,884, or WO-A 01/02816. Using at least one additional temperature sensor attached to the transducer case, the effect of thermal expansions of, or thermal stresses in, the transducer case on the measured-value signal are compensated for by forming in the meter electronics a further correction factor which takes into account the effects of the measured temperature on the expansions or the stress distribution in the transducer, and including this correction factor in the formation of the measured-value signal. To form this correction factor, each of the temperature signals multiplied, simultaneously and undelayed, by constant coefficients and, if necessary, by itself.

It turned out, however, that during the operation of process meters of the kind described, the temperature distribution may be subject to considerable variations, particularly because the temperature of the fluid cannot generally be held constant, so that within the process meter, particularly within the transducer, dynamic transients occur repeatedly with respect to the temperature distribution. On the other hand, these temporal variations in temperature distribution, because of different specific thermal conductivities or heat capacities of individual components of the transducer, may propagate to individual sensitivity-determining components of the transducer at different rates, so that even temperature profiles or temperature gradients sensed by means of two or more temperature sensors may be subject to dynamic changes.

In process meters which, as shown in U.S. Pat. No. 4,768,384 or WO-A 01/02816, for example, determine corresponding correction factors for the measurement signal using static algorithms which only take into account instantaneous temperature values, this may result in considerable inaccuracies occurring in the measured value signal during the unsteady state of the temperature distribution, despite the use of such correction factors derived from different temperatures which are sensed at different locations but uniformly weighted. Investigations have shown that such non-stationary transition regions of the temperature distribution, which particularly cause changes in the mechanical stresses within the transducer, may last from a few minutes to a few hours, and that during this frequently relatively long time of the unsteady state of the temperature distribution, the effects of the locally sensed temperatures on the measurement signal(s) in relation to each other may change as well.

In transducers with a vibrating flow tube, one possibility of reducing such errors in the measurement signal may be to install a plurality of temperature sensors along the flow tube and along the transducer case and/or along the supporting element that may be provided for the single flow tube.

One disadvantage of such a solution is that the manufacturing costs increase with the number of temperature sensors used. Aside from the costs of the temperature sensors themselves, the costs of mounting and wiring them increase.

In addition, however, an increase in the number of temperature sensors may result in an increased failure probability of the sensor arrangement, particularly if the temperature sensors are fixed to components vibrating at high frequencies, for instance to the flow tube or to a supporting element designed as an antivibrator.

SUMMARY OF THE INVENTION

It is therefore an object of the invention to improve process meters of the kind referred to at the beginning in such a way that even in the unsteady transition region of the temperature distribution within their respective transducers, thermally induced errors in the measurement signal are largely compensated for, and that as few temperature sensors as possible are needed to determine as accurate a correction factor as possible for temperature effects on the measurement signal.

To attain the object, the invention provides a process meter for measuring at least one physical process variable, particularly a mass flow rate, density, viscosity, pressure, or the like, of a medium stored in a process container or flowing in a process line, the meter comprising:

a transducer
  with a sensor arrangement providing measurement signals
    which comprises at least a first sensor providing at least a first measurement signal in response to the physical process variable being measured, particularly to changes in the process variable, and
    which further comprises at least a first temperature sensor mounted in the transducer for locally sensing a first temperature in the transducer, and
    which provides, by means of the at least one temperature sensor, at least a first temperature measurement signal representing the first temperature in the transducer; and
  meter electronics which, using at least the first measurement signal and a first correction value for the at least first measurement signal, derive at least one measured value currently representing the physical variable, particularly a measured mass flow rate value, density value, viscosity value, or pressure value,
  wherein during operation, the meter electronics determine the first correction value from a temporal variation of the at least first temperature measurement signal by also taking into account temperature values sensed in the past by means of the first temperature sensor.

In a first preferred embodiment of the invention, the meter electronics respond to a change in the first temperature measurement signal, corresponding to a change in the first temperature, with a change in the first correction value after a time delay.

In a second preferred embodiment of the invention, the sensor arrangement comprises at least a second temperature sensor mounted in the transducer, particularly in spaced relationship from the first temperature sensor, for locally sensing a second temperature in the transducer, and provides, by means of the second temperature sensor, at least a second temperature measurement signal, which represents the second temperature.

In a third preferred embodiment of the invention, the meter electronics determine the first correction value by also using the second temperature measurement signal.

In a fourth preferred embodiment of the invention, the meter electronics determine a second correction value from a temporal variation of at least the second temperature measurement signal, and derive the measured value by also using the second correction value.

In a fifth preferred embodiment of the invention, the meter electronics comprise a filter stage for deriving the at least first correction value, with the first temperature measurement signal being applied to a first signal input of the filter stage.

In a sixth preferred embodiment of the invention, the filter stage comprises a first A/D converter for converting the first temperature measurement signal to a first digital signal.

In a seventh preferred embodiment of the invention, the filter stage comprises a first digital filter for the first digital signal.

In an eighth preferred embodiment of the invention, the first digital filter is a recursive filter. In a ninth preferred embodiment of the invention, the first digital filter is a nonrecursive filter.

In a tenth preferred embodiment of the invention, the first digital filter supplies the first correction value to a first signal output of the filter stage.

In an eleventh preferred embodiment of the invention, the filter stage also serves to derive the second correction value, in which case the second temperature measurement signal is applied to a second signal input of the filter stage, and the filter stage comprises a second A/D converter for converting the second temperature measurement signal to a second digital signal.

In a twelfth preferred embodiment of the invention, the filter stage comprises a second digital filter for the second digital signal.

In a thirteenth preferred embodiment of the invention, the transducer comprises at least one flow tube for conducting the, particularly flowing, medium.

In a fourteenth preferred embodiment of the invention, at least one of the two temperature sensors is mounted on the flow tube or in the vicinity thereof.

In a fifteenth preferred embodiment of the invention, the transducer comprises a transducer case which at least partially encloses the flow tube.

In a sixteenth preferred embodiment of the invention, at least one of the two temperature sensors is fixed to the transducer case or positioned at least in the vicinity thereof.

In a seventeenth preferred embodiment of the invention, the transducer further comprises a, particularly electrodynamic or electromagnetic, vibration exciter electrically connected to the meter electronics for driving the flow tube, and the meter electronics provide at least one excitation signal for controlling the vibration exciter, so that in operation, the flow tube vibrates at least intermittently.

In an eighteenth preferred embodiment of the invention, the first sensor responds to vibrations of the flow tube, particularly to inlet-side or outlet-side vibrations, and the measurement signal provided by the first sensor represents mechanical vibrations of the vibrating flow tube which are influenced by the process medium.

In a nineteenth preferred embodiment of the invention, the transducer comprises a supporting element fixed to the flow tube, particularly a supporting element mounted in the transducer case so as to be capable of vibratory motion, for supporting the vibration exciter and at least the first sensor.

In a twentieth preferred embodiment of the invention, at least one temperature sensor is fixed to the supporting element or positioned at least in the vicinity thereof.

In a twenty-first preferred embodiment of the invention, the sensor arrangement comprises at least a second sensor, which provides at least a second measurement signal in response to the physical process variable to be measured, in which case the meter electronics derive the measured value by also using the second measurement signal.

A basic idea of the invention is, on the one hand, to determine the instantaneous sensitivity of the transducer to the process variable to be measured on the basis of its instantaneous internal temperature distribution and to correspondingly compensate the measurement signals affected thereby, and, on the other hand, to sufficiently accurately estimate the instantaneous temperature distribution in the transducer based on temperatures measured in the past, particularly using as few temperature sensors as possible.

Besides the low circuit complexity for the temperature measurement, the invention has a further advantage in that more degrees of freedom are created for positioning the temperature sensors within the transducer, since the respective positions of the temperature sensors can now be incorporated in the correction of the respective temperature measurement signals. Thus, the temperature sensors can be optimally positioned, particularly from an assembly and/or wiring point of view.

In the case of the above-mentioned vibratory process meters, this also has the advantage that for the purpose of estimating the effective temperature distribution of the flow tube and/or of the optional supporting element, the temperature sensors can also be readily fixed to nonvibrating transducer components, such as the transducer case.

DESCRIPTION OF THE PREFERRED EMBODIMENTS

Figure 1:
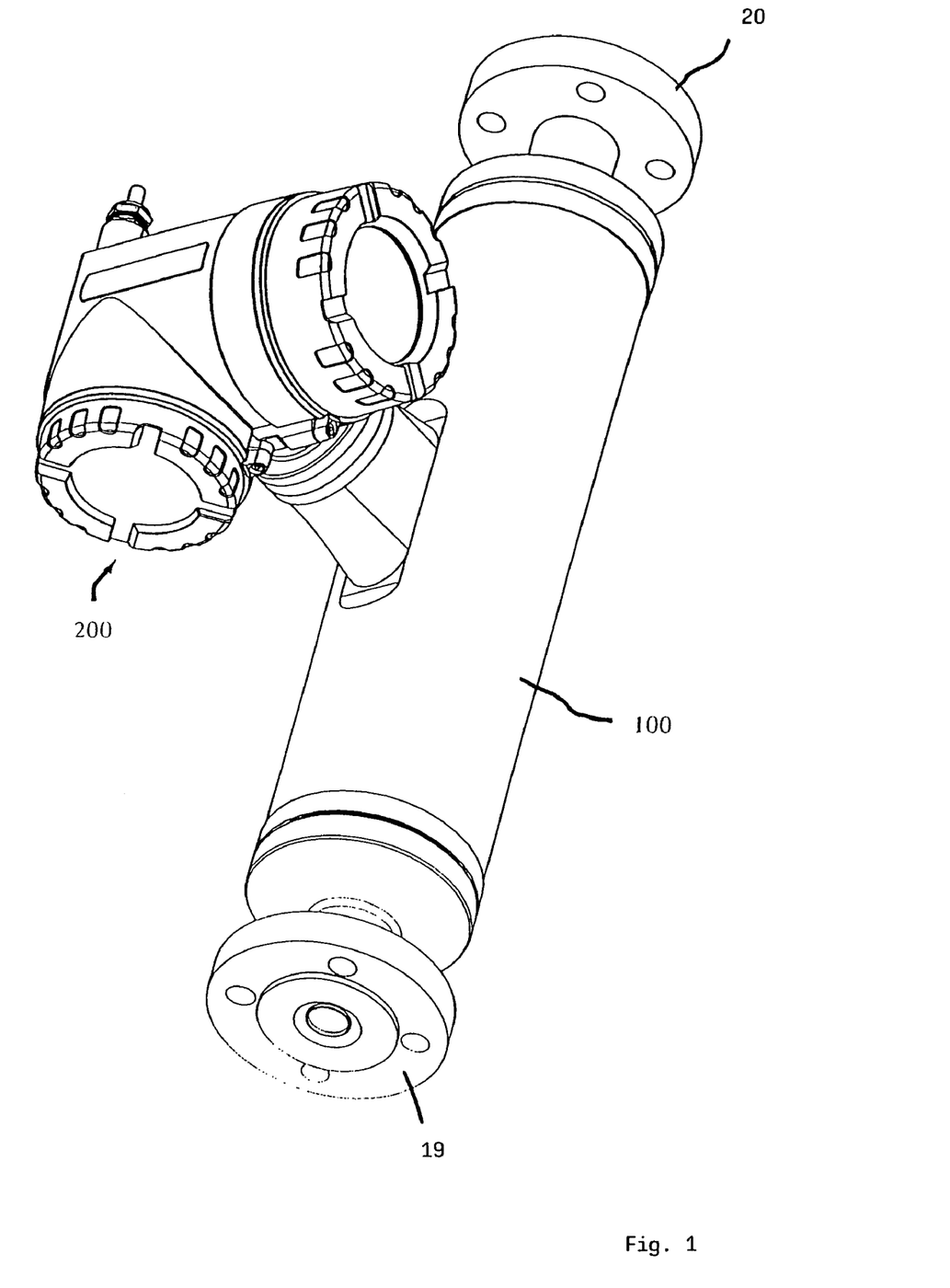
FIG. 1 is a perspective view of a process meter.
Figure 2:
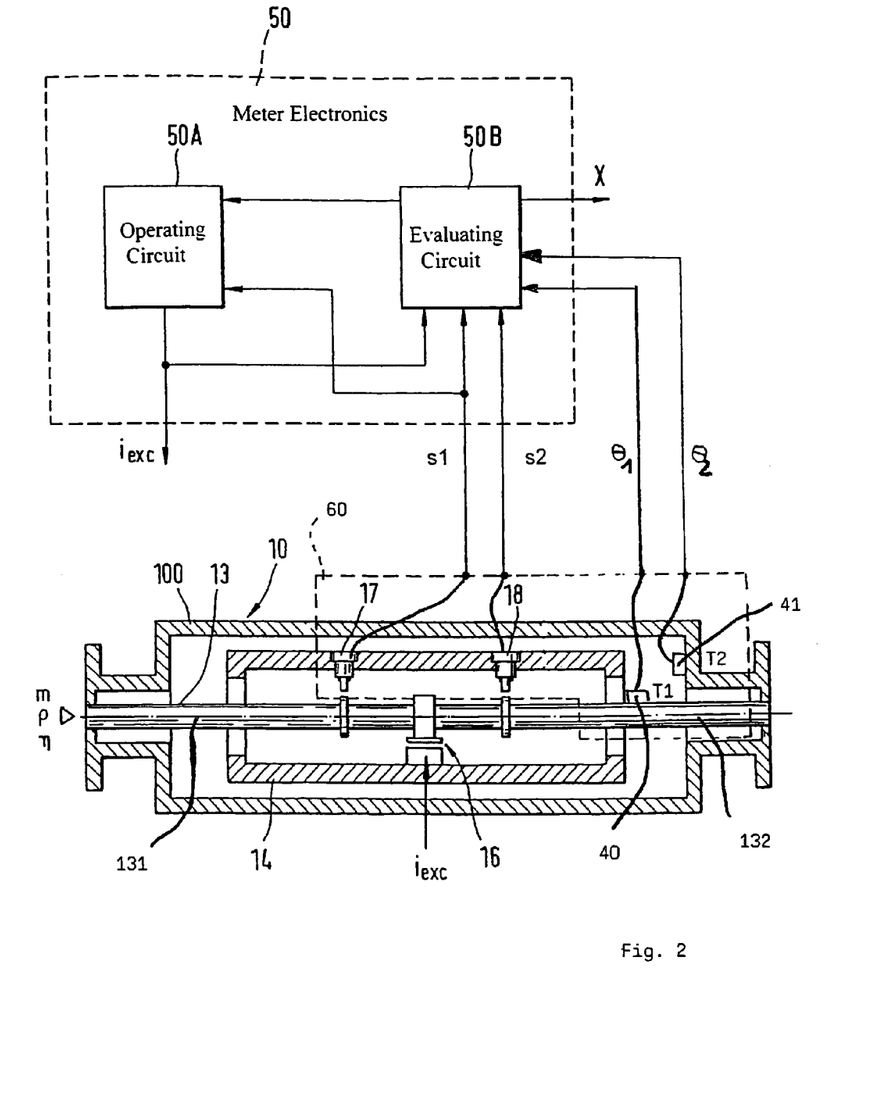
FIG. 2 shows meter electronics suitable for the process meter of FIG. 1 in block-diagram form, and a vibratory transducer coupled thereto.

In FIGS. 1 and 2, there is shown an embodiment of a process meter, for instance a Coriolis mass flowmeter, a densimeter, and/or a viscometer, comprising a vibratory transducer 10, preferably housed in a transducer case 100, and an electronics case 200, containing meter electronics 50 electrically connected to transducer 10.

The process meter serves to sense a process variable, such as a mass flow rate, density, and/or viscosity, of a fluid flowing in a pipe, and to map this process variable into a measured-value signal representative thereof; the pipe is not shown for the sake of clarity.

To conduct the fluid, transducer 10 comprises a flow tube 13 which in operation is vibrated, preferably in a flexural mode, to produce in the fluid flowing therethrough reaction forces, e.g. Coriolis forces, acceleration forces, and/or friction forces, of sufficient intensity which are dependent on the process variable and which react on transducer 10 in a measurable manner, i.e., which can be detected using sensor technology and converted into useful input signals for subsequent evaluation electronics.

Figure 3:
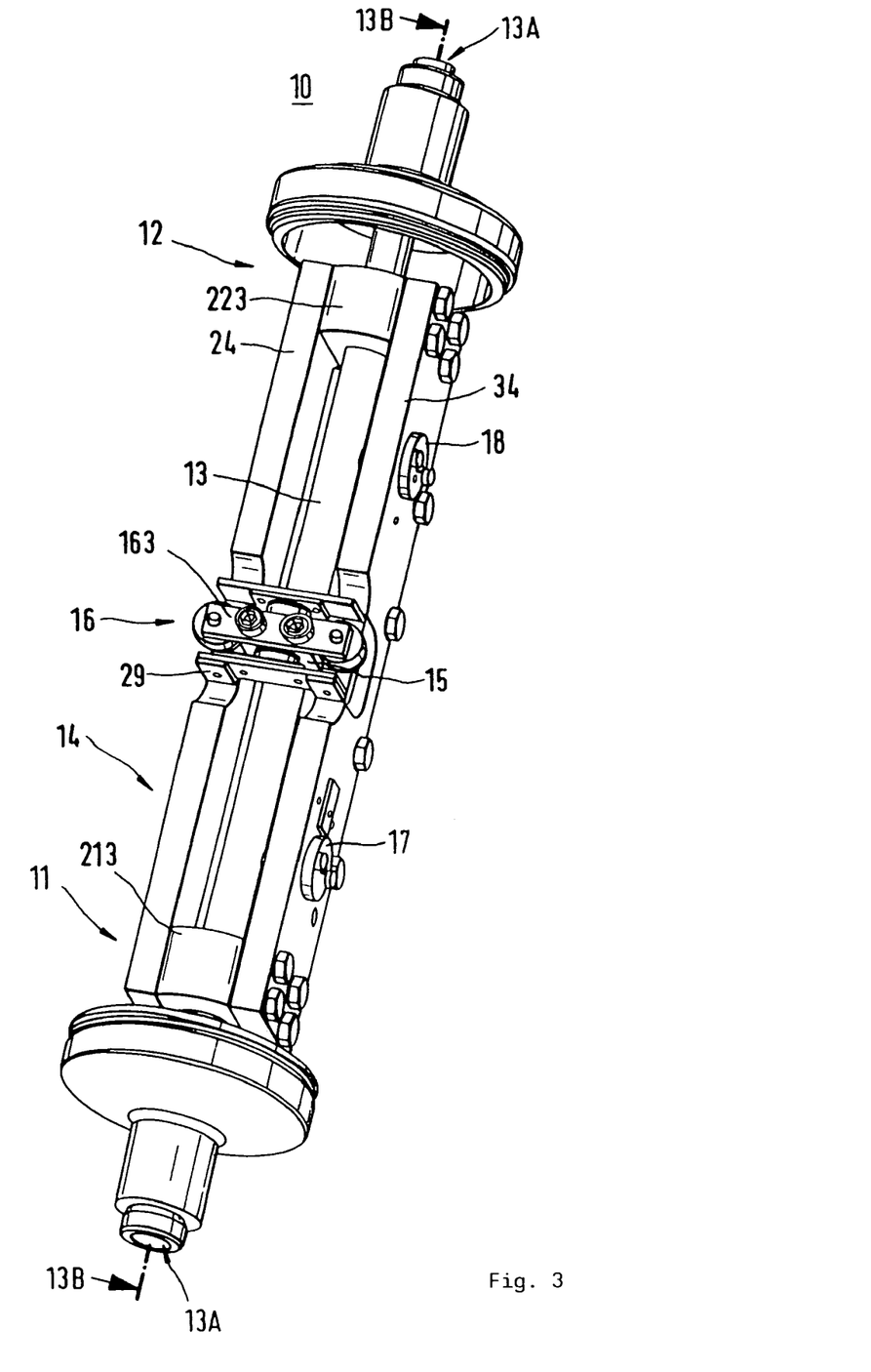
FIG. 3 is a first perspective view, partially in section, of an embodiment of a vibratory transducer suitable for the process meter of FIG. 1.
Figure 4:
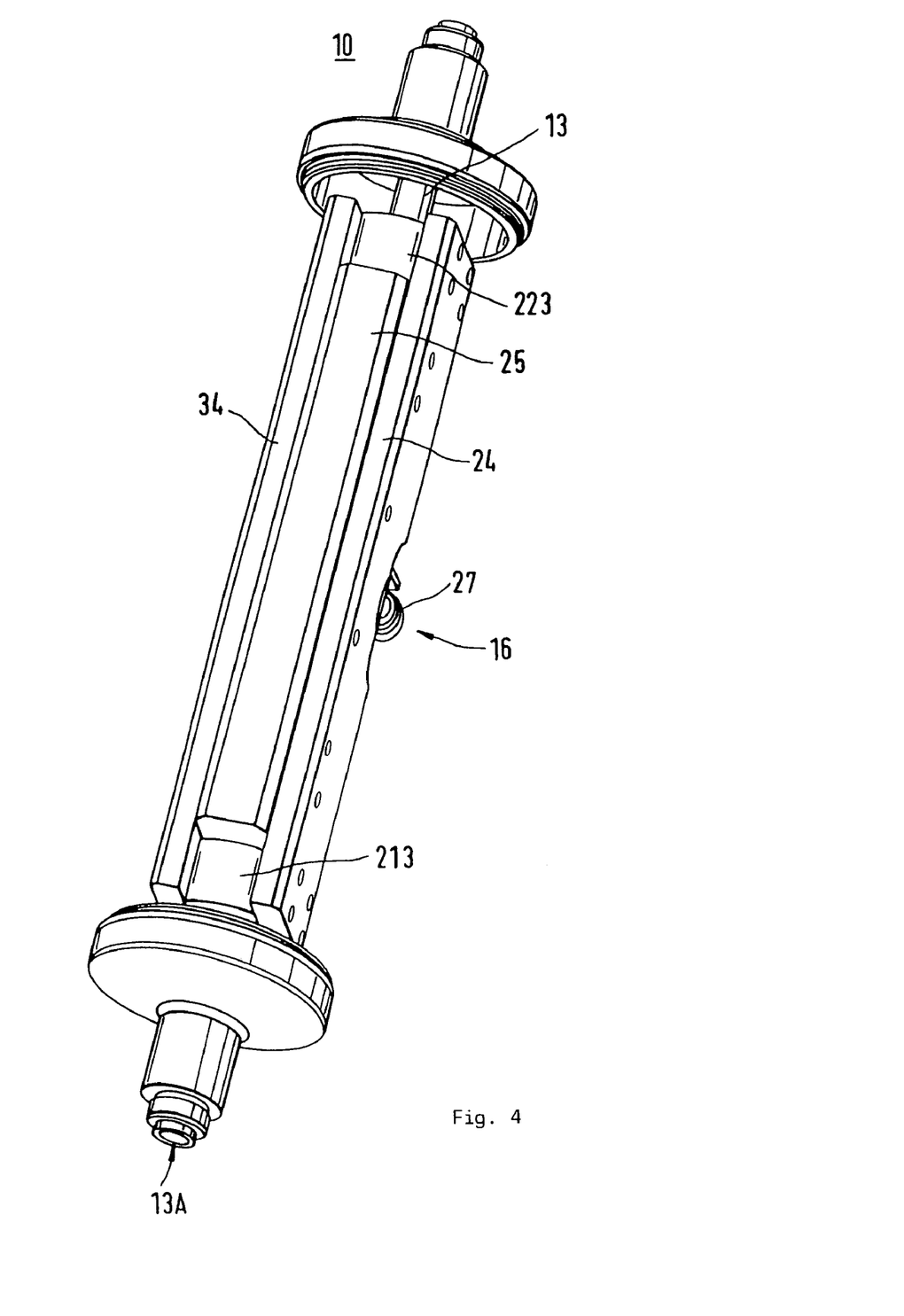
FIG. 4 is a second perspective view of the transducer of FIG. 3.

FIGS. 3 and 4 show an embodiment of a vibratory physical-to-electrical transducer assembly suitable for use as transducer 10. The construction of such a transducer assembly is described in detail in U.S. Pat. No. 6,006,609, for example.

To conduct the fluid to be measured, transducer 10 comprises at least one flow tube 13 having a predeterminable, elastically deformable lumen 13A with a predeterminable nominal diameter. Flow tube 13 has an inlet end 11 and an outlet end 12.

"Elastic deformation of lumen 13A" as used herein means that in order to produce the above-mentioned reaction forces in the fluid, which are thus descriptive of the fluid, a three-dimensional shape and/or a spatial position of lumen 13A are changed in a predeterminable cyclic manner, particularly periodically, within an elasticity range of flow tube 13; compare, for instance, U.S. Pat. No. 4,801,897, U.S. Pat. No. 5,648,616, U.S. Pat. No. 5,796 011, or U.S. Pat. No. 6,006,609. If necessary, the flow tube, as shown in EP-A 1 260 798, for example, may be curved. It is also possible, for example, to use two curved or straight flow tubes instead of a single tube. Further implementations of transducer assemblies suitable for use as transducer 10 are described, for instance, in U.S. Pat. No. 5,301,557, U.S. Pat. No. 5,357,811, U.S. Pat. No. 5,557,973, U.S. Pat. No. 5,602,345, U.S. Pat. No. 5,648,616, or U.S. Pat. No. 5,796,011.

Material especially suited for flow tube 13, in FIGS. 3 and 4 a straight tube, are titanium alloys, for example. Instead of titanium alloys, other materials commonly used for such flow tubes, particularly for curved tubes, such as stainless steel, tantalum, or zirconium, may be employed.

Flow tube 13, which communicates with the fluid-conducting pipe at the inlet and outlet ends in the usual manner, is clamped in a rigid support frame 14, particularly in a flexurally and torsionally stiff frame, so as to be capable of vibratory motion, the support frame being enclosed in a transducer case 100.

Support frame 14 is fixed to flow tube 13 at the inlet end by means of an inlet plate 213 and at the outlet end by means of an outlet plate 223, the two plates being penetrated by respective extension pieces 131, 132 of flow tube 13. Support frame 14 has a first side plate 24 and a second side plate 34, which are fixed to inlet plate 213 and outlet plate 223 so as to extend essentially parallel to and in spaced relationship from flow tube 13, compare FIG. 3. Thus, facing side surfaces of the two side plates 24, 34 are also parallel to each other.

A longitudinal bar 25 serving as a balancing mass for absorbing vibrations of flow tube 13 is secured to side plates 24, 34 in spaced relationship from flow tube 13. As shown in FIG. 4, longitudinal bar 25 extends essentially parallel to the entire oscillable length of flow tube 13. If necessary, longitudinal bar 25 may, of course, be shorter.

Thus, support frame 14 with the two side plates 24, 34, inlet plate 213, outlet plate 223, and longitudinal bar 25 has a longitudinal axis of gravity which is essentially parallel to a central flow tube axis 13B, which joins inlet end 11 and outlet end 12.

In FIGS. 3 and 4, it is indicated by the heads of the screws shown that the aforementioned fixing of side plates 24, 34 to inlet plate 213, to outlet plate 223, and to longitudinal bar 25 may be done by screwing; it is also possible to use other suitable forms of fastening familiar to those skilled in the art.

If transducer 10 is to be nonpermanently connected into the pipe, a first flange 19 and a second flange 20 are formed on flow tube 13 at the inlet and outlet ends, respectively, compare FIG. 1; instead of flanges 19, 20, other pipe coupling elements, such as the so-called Triclamp connections indicated in FIG. 3, may be used to provide the nonpermanent connection with the pipe. If necessary, however, flow tube 13 may also be connected with the pipe directly, for instance by welding or brazing.

To produce the above-mentioned reaction forces, during operation of transducer 10, flow tube 13, driven by an electromechanical excitation assembly 16 coupled to the flow tube, is caused to vibrate in the so-called useful mode at a predeterminable frequency, particularly at a natural resonance frequency, whereby the flow tube is elastically deformed in a predeterminable manner. As mentioned, this resonance frequency is also dependent on the instantaneous density of the fluid.

In the embodiment shown, the vibrating flow tube 13, as is usual with such flexural mode transducer assemblies, is spatially, particularly laterally, deflected from a static rest position; the same applies to transducer assemblies in which one or more curved flow tubes perform cantilever vibrations about a corresponding longitudinal axis joining the respective inlet and outlet ends, or to those in which one or more straight flow tubes perform only planar flexural vibrations about their longitudinal axis. In another case, where transducer 10 is a radial mode transducer assembly and the vibrating flow tube is symmetrically deformed in the usual manner as is described, for instance, in the above-mentioned WO-A 95/16897, the longitudinal flow-tube axis is essentially left in its static rest position.

Excitation assembly 16 serves to produce an excitation force $F_{exc}$ for flow tube 13 by converting an electric excitation power $P_{exc}$ supplied from the meter electronics. When flow tube 13 is excited at a natural resonance frequency, the excitation power $P_{exc}$ serves virtually only to compensate the power component lost in the vibrating system because of mechanical and fluid friction. To achieve as high an efficiency as possible, the excitation power $P_{exc}$ is preferably adjusted so that essentially the vibrations of flow tube 13 in the desired useful mode, e.g., those at a fundamental resonance frequency, are maintained.

Figure 5:
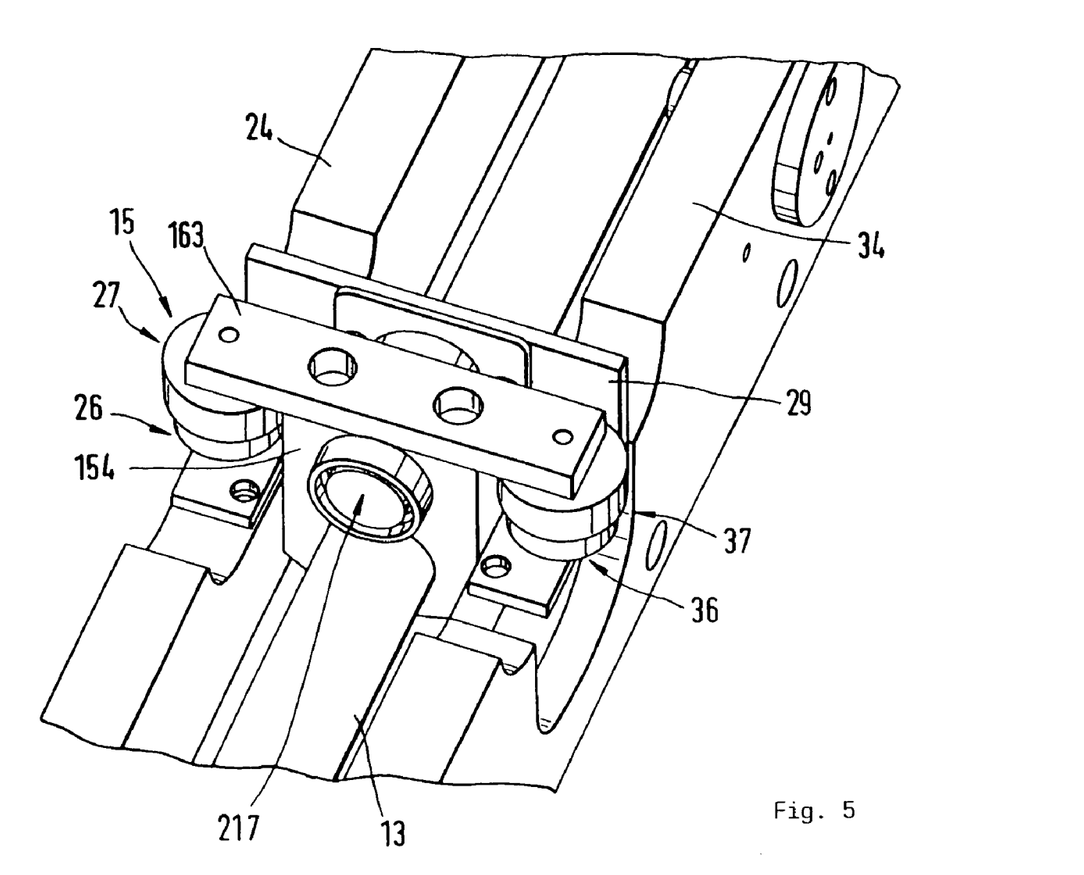
FIG. 5 shows an embodiment of an electromechanical excitation assembly for the transducer of FIG. 3.

For the purpose of transmitting the excitation force $F_{exc}$ to flow tube 13, excitation assembly 16, as shown in FIG. 5, has a rigid, electromagnetically and/or electrodynamically driven lever arrangement 15 with a cantilever 154 and a yoke 163, the cantilever 154 being rigidly fixed to flow tube 13. Yoke 163 is rigidly fixed to an end of cantilever 154 remote from flow tube 13, such that it lies above and extends transversely of flow tube 13.

Cantilever 154 may be a metal plate, for example, which receives flow tube 13 in a bore. For further suitable implementations of lever arrangement 15, reference is made to the above-mentioned U.S. Pat. No. 6,006,609. Lever arrangement 15 is a T-shaped arrangement and is arranged to act on flow tube 13 approximately midway between inlet end 11 and outlet end 12, cf. FIG. 5, so that in operation, flow tube 13 will undergo its greatest lateral deflection at its midpoint. To drive the lever arrangement 15, excitation assembly 16, as shown in FIG. 5, comprises a first excitation coil 26 and an associated first armature 27 of permanent-magnet material as well as a second excitation coil 36 and an associated second armature 37 of permanent-magnet material. The two excitation coils 26 and 36, which are preferably electrically connected in series, are fixed to support frame 14 on both sides of flow tube 13 below yoke 163, particularly nonpermanently, so as to interact in operation with their associated armatures 27 and 37, respectively. If necessary, the two excitation coils 26, 36 may, of course, be connected in parallel.

As shown in FIGS. 3 and 5, the two armatures 27, 37 are fixed to yoke 163 at such a distance from each other that during operation of transducer 10, armature 27 will be penetrated essentially by a magnetic field of excitation coil 26, while armature 37 will be penetrated essentially by a magnetic field of excitation coil 36, so that the two armatures will be moved by the action of corresponding electrodynamic and/or electromagnetic forces.

The motions of armatures 27, 37 produced by the magnetic fields of excitation coils 26, 36 are transmitted by yoke 163 and cantilever 154 to flow tube 13. These motions of armatures 27, 37 are such that yoke 163 is displaced from its rest position alternately in the direction of side plate 24 and in the direction of side plate 34. A corresponding axis of rotation of lever arrangement 15, which is parallel to the above-mentioned central flow-tube axis 13B, may pass through cantilever 154, for example.

Support frame 14, which serves as a supporting element for excitation assembly 16, further comprises a holder 29 for excitation coils 26, 36 and for individual components of a magnetic brake assembly 217, which is described below. Holder 29 is connected, preferably nonpermanently, with side plates 24, 34.

In the transducer 10 of the embodiment, the lateral deflections of the vibrating flow tube 13, which is firmly clamped at inlet end 11 and outlet end 12, simultaneously cause an elastic deformation of its lumen 13A; this elastic deformation extends over virtually the entire length of flow tube 13.

Furthermore, due to a torque acting on flow tube 13 via lever arrangement 15, torsion is induced, at least in sections of flow tube 13, about the central flow-tube axis 13B simultaneously with the lateral deflections, so that the flow tube vibrates in a mixed flexural and torsional mode, which serves as the useful mode. The torsion of flow tube 13 may be such that the direction of lateral displacement of the end of cantilever 154 remote from flow tube 13 is either the same as or opposite to that of the lateral deflection of flow tube 13. Flow tube 13 can thus perform torsional vibrations in a first flexural and torsional mode, corresponding to the former case, or in a second flexural and torsional mode, corresponding to the latter case. In the transducer 10 according to the embodiment, the natural fundamental resonance frequency of the second flexural and torsional mode, e.g., 900 Hz, is approximately twice as high as that of the first flexural and torsional mode.

For the case where flow tube 13 is to perform vibrations only in the second flexural and torsional mode, excitation assembly 16 advantageously incorporates a magnetic brake assembly 217 based on the eddy-current principle, which serves to stabilize the position of the above-mentioned axis of rotation. By means of magnetic brake assembly 217 it can thus be ensured that flow tube 13 always vibrates in the second flexural and torsional mode, so that any perturbing external effects on flow tube 13 will not result in a spontaneous change to another flexural and torsional mode, particularly to the first. Details of such a magnetic brake assembly are described in U.S. Pat. No. 6,006,609.

At this point it should be mentioned that in the flow tube 13 deflected in this manner according to the second flexural and torsional mode, the central axis 13B is slightly deformed, so that during the vibrations, this axis spreads a slightly curved surface rather than a plane. Furthermore, a path curve lying in this surface and described by the midpoint of the central flow-tube axis has the smallest curvature of all path curves described by the central flow-tube axis.

To vibrate the flow tube 13, excitation assembly 16 is supplied from meter electronics with a likewise oscillating current $i_{exc}$ of adjustable amplitude and adjustable frequency $f_{exc}$, such that in operation, excitation coils 26, 36 are traversed by this current to produce the magnetic fields necessary to move armatures 27, 37. The excitation current $i_{exc}$, as shown schematically in FIG. 2, is supplied by an operating circuit 50A provided in meter electronics 50, and may be a harmonic alternating current, for example. In the embodiment shown here, the frequency $f_{exc}$ of the excitation current $i_{exc}$ is preferably chosen so or adjusts itself so that the laterally vibrating flow tube 13 vibrates, exclusively if possible, in the second flexural and torsional mode.

To detect the deformations of flow tube 13, transducer 10 has a sensor arrangement 60 comprising at least a first sensor 17, which provides a first, particularly analog, measurement signal $s_1$ in response to vibrations of flow tube 13, as shown in FIGS. 2 and 3. Sensor 17 may be formed, for instance, by an armature of permanent-magnet material which is fixed to flow tube 13 and interacts with a sensor coil held by support frame 14.

Sensor types especially suited for sensor 17 are those which sense the velocity of the deflections of the flow tube based on the electrodynamic principle. It is also possible to use acceleration-measuring electrodynamic or displacement-measuring resistive or optical sensors, or other sensors familiar to those skilled in the art and suitable for detecting such vibrations, e.g. sensors for sensing strains of flow tube 13.

Sensor arrangement 60 further comprises a second sensor 18, particularly a sensor identical to the first sensor 17, which second sensor 18 provides a second measurement signal $s_2$ representing vibrations of flow tube 13. In this embodiment, the two sensors 17, 18 are positioned at a given distance from each other along flow tube 13, particularly at the same distance from the midpoint of flow tube 13, such that sensor arrangement 60 detects both inlet-side and outlet-side vibrations of flow tube 13 and provides the corresponding measurement signals $s_1$, $s_2$.

As shown in FIG. 2, the first and second measurement signals $s_1$, $s_2$, which usually each have a frequency corresponding to the instantaneous vibration frequency of flow tube 13, are fed to a, preferably digital, evaluating circuit 50B in meter electronics 50 which is designed to determine, particularly numerically, a measured value X currently representing the process variable to be sensed, here the mass flow rate, density, viscosity, the pressure of a fluid, and to convert this measured value into a corresponding measured-value signal which is provided at the output of the evaluating circuit.

In a preferred embodiment of the invention, evaluating circuit 50B is implemented using a microcomputer provided in meter electronics 50, which is programmed to determine the measured value X from measurement signals provided by sensor arrangement 60. The microcomputer may be implemented using conventional microprocessors or state-of-the-art signal processors, for example.

While it is readily possible with the transducer shown here to determine the density or viscosity of a fluid on the basis of a single one of the measurement signals $s_1$, $s_2$, the mass flow rate is measured in the manner familiar to those skilled in the art using both measurement signals $s_1$, $s_2$ to thereby determine, e.g. in the form of a real number in the signal time domain or of a complex number in the signal frequency domain, a phase difference dependent on the mass flow rate.

The process meter is further provided with means which make it possible to compensate for effects of temperature on the measurement signals used, i.e., $s_1$ and/or $s_2$, and thus provide high accuracy over a wide temperature range and even during a change in the temperature distribution inside the transducer.

To that end, sensor arrangement 60 comprises at least a first temperature sensor 40, which serves to sense a first temperature $T_1$ at a first measurement point in the transducer and to provide a corresponding first electric temperature measurement signal $\theta_1$, particularly a continuous signal. Temperature sensor 40 is preferably so positioned in the transducer that, at least in the presence of a stationary temperature distribution in the transducer, the temperature measurement signal $\theta_1$ provided by this sensor is correlated as closely as possible with a temperature of the process medium; at this point it should be noted that the temperature measurement signal $\theta_1$, while preferably representing an absolutely measured first temperature, may also be, for instance, a temperature difference measured relative to a constant reference temperature.

In a preferred embodiment of the invention, temperature sensor 40 is arranged in the transducer to measure essentially a temperature of flow tube 13 and provide a corresponding first electric temperature measurement signal $\theta_1$. It may be mounted directly on flow tube 13, for example, but then it would be constantly subjected to the mechanical vibrations of the tube, which, in turn, would cause problems with regard to fatigue strength. Therefore, in the embodiment shown, temperature sensor 40 is preferably mounted on one of the comparatively less strongly vibrating extension portions 131, 132, here the outlet-side portion, of flow tube 13.

In a further preferred embodiment of the invention, in order to improve the measurement accuracy, sensor arrangement 60 comprises a second temperature sensor 41, which is arranged in transducer 10 to measure a second temperature $T_2$ at a second measurement point, located at a distance from the first measurement point. Temperature sensor 41 is preferably mounted on the inside of a wall of transducer case 100, so that it measures a temperature of transducer case 100 as the second temperature $T_2$. Temperature sensor 41 may also be fixed to support frame 14, for example.

It should be noted that with respect to the temperature compensation of the measurement signals alone, hardly any limitations on the arrangement of the temperature sensors 40, 41 within the transducer have to be taken into account, so that there are many other possibilities of positioning the at least one temperature sensor 40 and any further temperature sensors that may be provided. The temperature sensors used may be temperature sensors or the like familiar to those skilled in the art, particularly devices as are employed in conventional transducers. Preferably, temperature-sensitive resistors of metal, e.g. Pt1100 or Pt1000, or of semiconductor material will be used for the above applications. If necessary, in addition to the temperature sensors 40, 41, further temperature sensors provided in the meter, for instance near the electronics case, may be taken into account in compensating for temperature effects on the at least one measurement signal.

Figure 6:
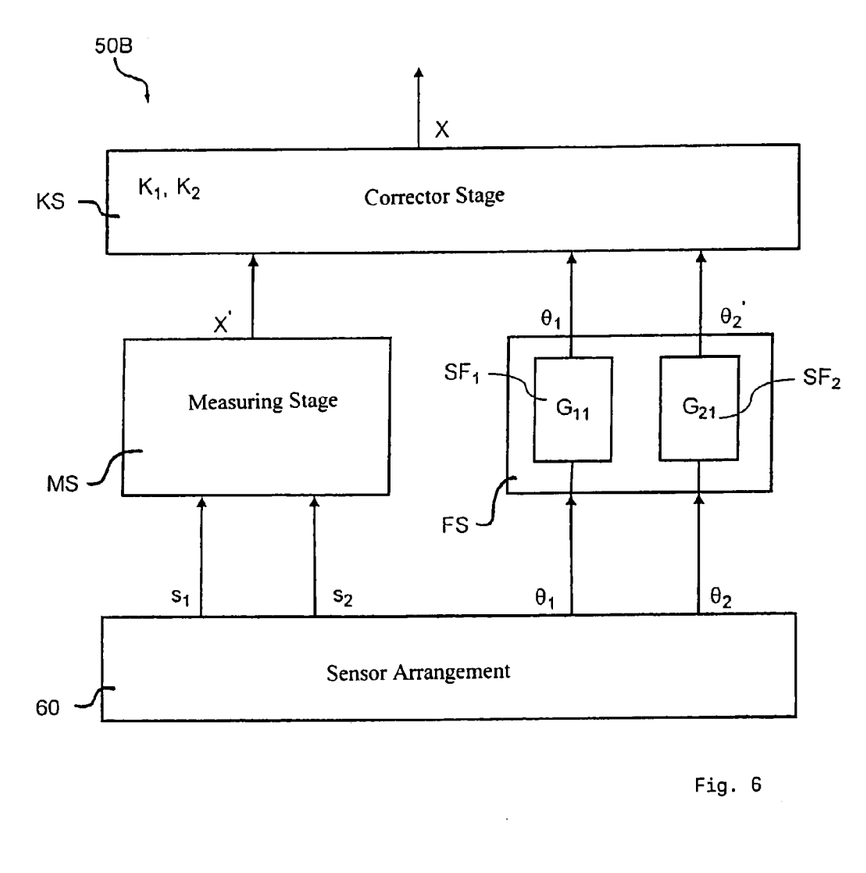
FIG. 6 is a block diagram of an evaluating circuit suitable for the meter electronics of FIG. 2.

As shown in FIG. 2 or 6, the temperature measurement signals $\theta_1$, $\theta_2$ provided by temperature sensors 40, 41 are applied from outputs of sensor arrangement 60 to evaluating circuit 50B, and are thus accessible for further processing, particularly for a compensation of the measurement signals $s_1$, $s_2$.

In a preferred embodiment of the invention, the measurement signal $s_1$, as illustrated schematically in FIG. 6, is first changed into a non-temperature-compensated or uncorrected intermediate measured value X' by means of a measuring stage MS provided in evaluating circuit 50B. This intermediate measured value X' is then corrected by means of evaluating circuit 50B using the at least one temperature measurement signal $\theta_1$ provided by sensor arrangement 60, and thus converted to the measured value X. Preferably, however, at least the temperature measurement signal $\theta_2$, which is also provided by sensor arrangement 60, is used in addition to temperature measurement signal $\theta_1$ to correct the intermediate measured value X'.

To correct the intermediate measured value X', at least a first, analog or digital, correction value $K_1$ for the uncorrected intermediate measured value X' derived from the at least one measurement signal $s_1$ is determined in a suitable corrector stage KS of evaluating circuit 50B. The correction value thus determined, $K_1$, can then be multiplied in corrector stage KS by the uncorrected measured value X' according to the following simple function:

$$X = K_1 \cdot X' \qquad (1)$$

The correction value $K_1$ formed by corrector stage KS is formed by taking into account the temperature measurement signal $\theta_1$, but preferably at least the two temperature measurement signals $\theta_1$, $\theta_2$ provided by sensor arrangement 60, as illustrated in FIG. 6.

Before that, according to the invention, at least the temperature measurement signal $\theta_1$ used to determine the at least one correction value $K_1$ is converted to a temperature estimation signal $\theta_1'$. The generation of the temperature estimation signal $\theta_1'$ serves to estimate and map an instantaneous temperature distribution influenced by the temporal variation of the temperature measurement signal $\theta_1$, taking into account not only an instantaneous value of the temperature measurement signal $\theta_1$ as proposed, for example, in the above-mentioned U.S. Pat. No. 4,768,384, U.S. Pat. No. 5,687,100, WO-A 88/02476, or WO-A 01/02816, but also values from the past of the signal.

Thus, values of the temperature $T_1$ sensed earlier by temperature sensor 40 are also taken into account. An example of possible variations of the temperatures $T_1$, $T_2$ during a transition range of the time period $t_2-t_1$ is illustrated schematically in FIG. 7. If necessary, in addition to the temperature estimation signal $\theta_1'$, an instantaneous value of the temperature measurement signal $\theta_1$ may, of course, be taken into account in the formation of the measured value X.

In another preferred embodiment of the invention, the temperature estimation signal $\theta_1'$ is generated by means of meter electronics 50 on the basis of the following mathematical relationship:

$$\theta_1' = G_{10} + G_{11} * \theta_1 \ldots, \qquad (2)$$

where $G_{10}$ = a variable or constant coefficient, particularly a coefficient independent of the measured temperatures $G_{11}$ = a weighting function of a signal filter with which the temperature measurement signal $\theta_1$ provided by the sensor arrangement is folded.

The correction value $K_1$ can now be calculated from the temperature estimation signal $\theta_1'$ using simple, particularly linear, mathematical relationships, such as the following:

$$K_1 = 1 + k_{11} * \theta_1' \qquad (3)$$

where $k_{11}$ = a first coefficient which characterizes the relationship between the effective temperature estimated with the temperature estimation signal $\theta_1'$ and the correction value $K_1$ and is based on the sensitivity-influencing first parameter actually taken into account, for instance on a varying mechanical stress acting along the axis of flow tube 13.

If necessary, the self-amplitude-modulated temperature measurement signal $\theta_1$ in the form $G_{12} * \theta_1^2$ or the temperature measurement signal $\theta_1$ amplitude-modulated with the temperature measurement signal $\theta_2$, i.e., $G_{13} * \theta_1 \theta_2$, for example, may also be taken into account.

According to a further development of the invention, before the determination of the correction value $K_1$, at least the temperature measurement signal $\theta_2$, too, is converted to a corresponding second temperature estimation signal $\theta_2'$, for instance on the basis of the following mathematical relationship:

$$\theta_2' = G_{20} + G_{21} * \theta_2 \ldots, \qquad (4)$$

Neglecting any higher-order terms, the calculation rule for the correction value $K_1$ expressed in Eq. (3), which is only dependent on the temperature measurement signal $\theta_1$, may then be modified as follows:

$$K_1 = 1 + k_{11} \cdot \theta_1' + k_{12} \cdot \theta_2', \qquad (5)$$

so that the correction value $K_1$ is now also dependent on the temperature measurement signal $\theta_2$. The second coefficient $k_{12}$ introduced in Eq. (5), in analogy to Eq. (3), is a coefficient representing the relationship between the temperature estimation signal $\theta_2'$ and the correction value $K_1$. This coefficient is also based on the first parameter actually taken into account.

Using Eq. (5), the calculation rule for the measured value X formulated in Eq. (1) can then be refined as follows:

$$X = (1 + k_{11} \cdot \theta_1' + k_{12} \cdot \theta_2') \cdot X' \qquad (6)$$

In a preferred embodiment of the invention, in addition to the correction value $K_1$, a second correction value $K_2$ is determined for the uncorrected intermediate measured value X', particularly for the case where the instantaneous temperature distribution acts simultaneously on several parameters influencing the sensitivity of the transducer.

In the transducer shown here, the instantaneous temperature distribution influences, for instance, both the elasticity modulus of flow tube 13 and, even though in another manner, an instantaneous distribution of mechanical stresses within transducer 10, particularly within flow tube 13. Accordingly, this instantaneous temperature distribution also influences the oscillatory behavior of flow tube 13 in a different manner, e.g. with regard to the natural resonance frequencies of flow tube 13 or to the ratio between the vibration amplitudes of the useful mode and the Coriolis mode.

Taking this into account, the determination of the measured value X in the corrector stage is preferably based on the following mathematical relationship, which is an expansion of Eq. (1):

$$X = K_1 \cdot K_2 \cdot X'. \qquad (7)$$

The conversion of the measurement signal $s_1$ into the intermediate measured value X' and the combination of the latter with the, preferably digital, correction value $K_1$ or the correction values $K_1$, $K_2$ has the advantage that for this way of obtaining the measured value X from the intermediate measured value X' and the correction value $K_1$, $K_2$, practically no major changes are required in the methods of measurement and evaluation hitherto used in conventional process meters of the kind described.

Based on Eqs. (1), (3), (5), (6), and/or (7), the intermediate measured value X' can now readily be corrected taking into account further sensitivity-influencing parameters. For instance, taking into account a second parameter influencing the sensitivity of the transducer the measured value X can be obtained in a simple manner from $$X = (1 + k_{11} \cdot \theta_1' + k_{12} \cdot \theta_2') \cdot (1 + k_{21} \cdot \theta_1'') \cdot X' \qquad (8)$$

where $k_{21}$ = a third coefficient, representing the relationship between the temperature estimation signal $\theta_1'$ and the correction value $K_1$, which third coefficient is based on the second parameter actually taken into account, for instance on a varying modulus of elasticity.

A comparison of coefficients between Eq. (6) and Eq. (8) shows that the correction value $K_2$ can then be calculated, for example, from $$K_2 = 1 + k_{21} \cdot \theta_1', \qquad (9)$$

To generate the at least one temperature estimation signal $\theta_1'$, in a further preferred embodiment, the meter electronics according to the invention comprise a filter stage FS connected ahead of corrector stage KS for filtering temperature measurement signals provided by sensor arrangement 60. Filter stage FS comprises at least a first signal filter $SF_1$ for the temperature measurement signal $\theta_1$, compare FIG. 6. For the preferred case where the correction circuit also uses the second temperature estimation signal $\theta_2'$, at least a second signal filter $SF_2$ for the temperature measurement signal $\theta_2$ is provided in filter stage FS.

Signal filters $SF_1$, $SF_2$ of filter stage FS are so designed and matched, particularly with respect to their orders and parameters, that with the respective weighting functions thus defined, $G_{11}$, $G_{21}$ and the respective temperature measurement signals folded thereover, $\theta_1$, $\theta_2$, an instantaneous temperature distribution within transducer 10 which influences the measurement signals $s_1$, $s_2$ is replicated or simulated as exactly as possible, taking into account not only instantaneous values of the respective temperature signals $\theta_1$, $\theta_2$, but also values from the past of the respective temperature signals $\theta_1$, $\theta_2$. Moreover, the signal filters $SF_1$, $SF_2$ are so designed, particularly regarding their signal amplification and signal delay, that the effect of the at least implicitly estimated instantaneous temperature distribution on the sensitivity of the transducer is also taken into account in a compensating manner.

Preferably, the weighting function $G_{11}$ of signal filter $SF_1$ is chosen so that in response to a change, for instance an amplitude increase, in the temperature signal $\theta_1$, the temperature estimation signal $\theta_1'$ will take on a value proportional to the instantaneous value of the temperature signal $\theta_1$ after a distinct delay. Meter electronics 50B will then respond to a change in the first temperature measurement signal $\theta_1$ with a change in the first correction value $K_1$ after a corresponding time delay. For this purpose, the weighting function $G_{11}$, besides having a proportionally amplifying component, may also have at least one first-order or higher-order component integrating over time. Accordingly, signal filter SF1 may be a low-pass filter, for example.

The orders for the signal filters suitable for the respective transducer type can best be determined during the design and development of the process meter using prototypes of the meter. This may be done experimentally or using computer-aided numerical calculations, such as algorithms employing the finite element method. Based on the, particularly empirically, determined filter orders, the filter parameters actually suited for the respective process meter can then be determined, for example, by meter-specific or meter-type-specific calibration measurements, particularly in conjunction with computing algorithms which determine the filter parameters numerically and optimize them by the method of least squares or generically, for example.

Figure 7:
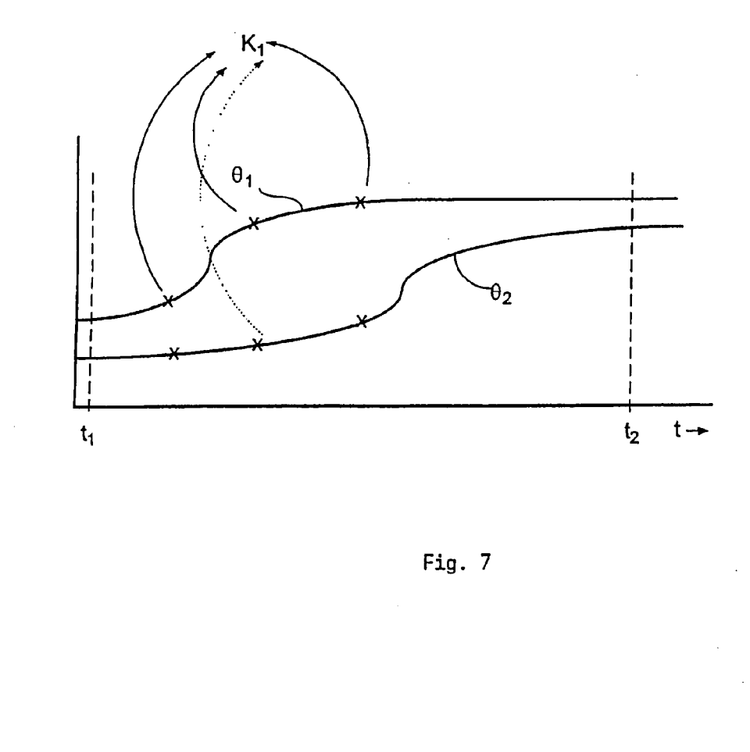
FIG. 7 shows schematically an example of possible temperature variations in the transducer of FIG. 2.
Figure 8:
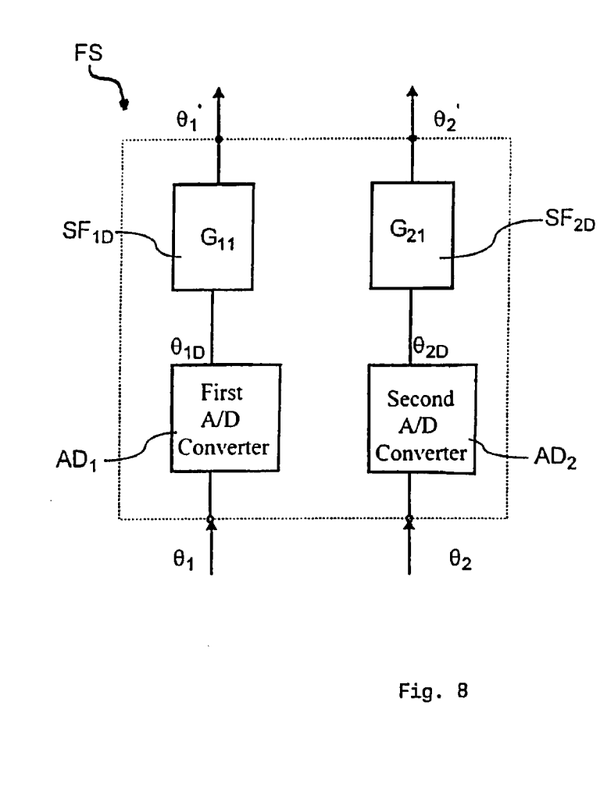
FIG. 8 is a block diagram of a development of the evaluating circuit of FIG. 6.

According to a further preferred development of the invention, the first temperature signal $\theta_1$ provided by sensor arrangement 60, before being processed in the evaluating circuit, but at any rate before the calculation of the correction value $K_1$, is time-discretely sampled and converted to a first digital signal $\theta_{1D}$ by means of a first A/D converter $AD_1$, as shown schematically in FIGS. 7 and 8. Analogously, as shown schematically in FIG. 8, the preferably likewise used second temperature signal $\theta_2$ is converted to a second digital signal $\theta_{2D}$ by means of a second A/D converter $AD_2$.

In a preferred embodiment of this development, the signal filter for the temperature measurement signal $\theta_1$ is a digital signal $SF_{1D}$ which implements the following numerical algorithm for computing the temperature estimation signal $\theta_1'$:

$$\theta_{1,t}' = \sum_{k=0}^{M} a_k \cdot \theta_{1,t-k \cdot \Delta t} - \sum_{k=1}^{N} b_k \cdot \theta_{1,t-k \cdot \Delta t}' \qquad (10)$$

where at least two, but preferably several of M possible coefficients $a_K$ are nonzero. Analogously, a second digital signal filter $SF_{2D}$ may be used for the temperature measurement signal $\theta_2$, compare FIG. 8.

If, in the general calculation rule given by Eq. (10), at least one of the N possible coefficients $b_K$ is nonzero, the digital signal filter $SF_{1D}$ implemented in this way will be a recursive filter with an at least theoretically infinite impulse response; otherwise, the digital signal filter $SF_{1D}$ will be a finite impulse response nonrecursive filter.

For the aforementioned case where the temperature measurement signals $\theta_1$, $\theta_2$ are digitized, i.e., if they are used in the form of sampling sequences, and if microprocessors of suitable capacity, particularly signal processors, are employed, filter stage FS can be practically completely implemented with the aforementioned microcomputer and suitable software, which also comprises the computing algorithms for the digital signal filters. Furthermore, both the correction value $K_1$ and the measured value X can advantageously be determined by executing suitable computer programs by means of a microcomputer.

Having knowledge of the invention, the person skilled in the art will hardly have any difficulty in designing a suitable digital or hybrid, i.e., mixed analog and digital, evaluating circuit, particularly a suitable filter stage which, using the available temperature measurement signals $\theta_1$, $\theta_2$ and comparison measurements for the process variable, processes the measurement signal $s_1$ or the measurement signals in such a way that the uncorrected measured value X' in combination with the at least one correction value $K_1$ results in a measured value X with sufficient accuracy.

The invention claimed is:

1. A process meter for measuring at least one physical process variable of a medium stored in a process container or flowing in a process line, comprising:

a transducer including a sensor arrangement providing measurement signals ($s_1$, $s_2$), said sensor arrangement having: at least a first sensor providing at least a first measurement signal ($s_1$) in response to the physical process variable being measured, particularly to changes in the process variable, and at least a first temperature sensor mounted in said transducer for locally sensing a first temperature, $T_1$, in the transducer, and by means of said at least one temperature sensor, at least a first temperature measurement signal ($\theta_1$) representing the first temperature, $T_1$, in said transducer; and meter electronics which, using at least said first measurement signal ($s_1$) and a first correction value ($K_1$) for the at least first measurement signal ($s_1$), derive at least one measured value (X) currently representing the physical variable, wherein:

during operation, said meter electronics determine the first correction value ($K_1$) from a temporal variation of the at least first temperature measurement signal ($\theta_1$) by also taking into account temperature values sensed in the past by means of said first temperature sensor.

2. The process meter as defined in claim 1, wherein:
during operation, said meter electronics respond to a change in the first temperature measurement signal ($\theta_1$), corresponding to a change in the first temperature, with a change in the first correction value ($K_1$) after a time delay.

3. The process meter as defined in claim 1, wherein:
said sensor arrangement further has at least a second temperature sensor mounted in said transducer, particularly in spaced relationship from said first temperature sensor, for locally sensing a second temperature, $T_2$, in said transducer, and wherein:
by means of said second temperature sensor, said sensor arrangement provides at least a second temperature measurement signal ($\theta_2$), representing the second temperature, $T_2$.

4. The process meter defined in claim 3, wherein:
said meter electronics determine the first correction value ($K_1$) by also using the second temperature measurement signal ($\theta_2$).

5. The process meter as defined in claim 3, wherein:
said meter electronics determine a second correction value ($K_2$) from a temporal variation of at least the second temperature measurement signal ($\theta_2$); and
said meter electronics derive the measured value (X) by also using the second correction value ($K_2$).

6. The process meter as defined in claim 1, wherein:
said meter electronics comprise a filter stage (FS) for deriving the at least first correction value ($K_1$), with the first temperature measurement signal ($\theta_1$) being applied to a first signal input of said filter stage (FS).

7. The process meter as defined in claim 6, wherein:
said filter stage (FS) comprises a first A/D converter ($AD_1$) for converting the first temperature measurement signal ($\theta_1$) to a first digital signal ($\theta_{1D}$).

8. The process meter as claimed in claim 7, wherein:
said filter stage comprises a first digital signal filter ($SF_{1D}$) for the first digital signal ($\theta_{1D}$).

9. The process meter as defined in claim 8, wherein:
said first digital signal filter ($SF_{1D}$) is a recursive filter.

10. The process meter as defined in claim 8, wherein:
said first digital signal filter is a nonrecursive filter.

11. The process meter as defined in claim 8, wherein: said first digital signal filter computing said first digital signal based on the numerical algorithm defined by:

$$\theta'_{1,t} = \sum_{k=0}^{M} a_k \cdot \theta_{1,t-k\cdot\Delta t} - \sum_{k=1}^{N} b_k \cdot \theta'_{1,t-k\cdot\Delta t},$$

wherein $\theta'_{1,t}$ is an instantaneous value of said value first digital signal, $\theta'_{1,t-\Delta t}$ is a previous value of said value first digital signal, $a_k$ is an ensemble of M nonzero coefficients of the numerical algorithm with $M \geq 2$, $b_k$ is an ensemble of N coefficients of the numerical algorithm with $N \geq 0$.

12. The process meter as defined in claim 6, wherein:
said filter stage (FS) also serves to derive the second correction value ($K_2$), in which case the second temperature measurement signal ($\theta_2$) is applied to a second signal input of said filter stage (FS); and
said filter stage (FS) comprises a second A/D converter ($AD_2$) for converting the second temperature measurement signal ($\theta_2$) to a second digital signal ($\theta_{2D}$).

13. The process meter as defined in claim 6, wherein:
said filter stage comprises a second digital signal filter for the second digital signal ($\theta_{2D}$).

14. The process meter as defined in claim 1, wherein:
said transducer comprises at least one flow tube for conducting the flowing medium.

15. The process meter as defined in claim 14, wherein:
at least one of said two temperature sensors is mounted on said flow tube or in the vicinity thereof.

16. The process meter as defined in claim 14, wherein:
said transducer comprises a transducer case enclosing said flow tube.

17. The process meter as defined in claim 16, wherein:
at least one of said temperature sensors is fixed to said transducer case or positioned at least in the vicinity thereof.

18. The process meter as defined in claim 14, wherein:
said transducer further comprises a electrodynamic electromagnetic vibration exciter electrically connected to said meter electronics for driving said flow tube; and
said meter electronics provide at least one excitation signal ($i_{exc}$) for controlling said vibration exciter, so that in operation, said flow tube is vibrated at least intermittently.

19. The process meter as defined in claim 18, wherein:
said first sensor responds to vibrations of said flow tube, particularly to inlet-side or outlet-side vibrations; and
the measurement signal ($s_1$) provided by said first sensor represents mechanical vibrations of said vibrating flow tube which are influenced by the process medium.

20. The process meter as defined in claim 18, wherein:
said transducer comprises a supporting element fixed to said flow tube, particularly a supporting element mounted in said transducer case so as to be capable of vibratory motion, for supporting said vibration exciter and at least said first sensor.

21. The process meter as defined in claim 20, wherein:
at least said first temperature sensor is fixed to said supporting element or positioned at least in the vicinity thereof.

22. The process meter as defined in claim 1, wherein:
said sensor arrangement comprises at least a second sensor for providing at least a second measurement signal ($S_2$) in response to the physical process variable; and
said meter electronics derive the measured value by also using the second measurement signal.

23. The process meter as defined in claim 1, wherein:
said meter is one of: a mass flow rate meter, a density meter, a viscosity meter, a pressure meter, or the like.

24. A method for compensating errors thermally induced in a measurement signal due to unsteady temperature distribution within a transducer of a process meter for measuring at least one physical process variable of a medium stored in a process container or flowing in a process line, said transducer including at least a first sensor for providing at least a first measurement signal in response to the physical process variable to be measured, and at least a first temperature sensor mounted in said transducer for locally sensing a first temperature in the transducer, said method comprising steps of:
- generating, by means of at least said first sensor, said first measurement signal, and generating, by means of at least said first temperature sensor, at least a first temperature measurement signal representing said first temperature in the transducer;
- determining from a temporal variation of said first temperature measurement signal a first correction value for at least the first measurement signal; and
- using said first measurement signal and said first correction value to derive at least one measured value currently representing the physical variable;
- wherein the step of determining the first correction value includes a step of taking into account temperature values sensed in the past by means of said first temperature sensor.

25. The method as claimed in claim 24, wherein the transducer further includes at least a second temperature sensor mounted in said transducer for locally sensing a second temperature in the transducer, said method further comprising a step of generating, by means of at least said second temperature sensor, at least a second temperature measurement signal representing said second temperature in the transducer.

26. The method as claimed in claim 24, further comprising the steps of:
- determining from a temporal variation of said second temperature measurement signal a second correction value for at least the first measurement signal; and
- using also said second correction value to derive at least one measured value currently representing the physical variable.

27. The method as claim 24, wherein the step of determining the first correction value includes a step of taking into account temperature values sensed in the past by means of said second temperature sensor.

28. The method as claimed in claim 24, wherein the transducer further includes at least a second sensor for providing at least a second measurement signal in response to the physical process variable to be measured, said method further comprising a step of generating, by means of at least said second sensor, said second measurement signal.

29. The method as claimed in claim 24, further comprising step of using also said second measurement signal to derive said at least one measured value currently representing the physical variable.

30. The method as claimed in claim 24, further comprising a step of using a digital filter for generating said first correction value, said digital filter bases on the numerical algorithm defined by:

$$\theta'_{1,t} = \sum_{k=0}^{M} a_k \cdot \theta_{1,t-k\cdot\Delta t} - \sum_{k=1}^{N} b_k \cdot \theta'_{1,t-k\cdot\Delta t},$$

wherein $\theta'_{1,t}$ is a digital value currently derived from said first temperature signal, $\theta'_{1,t-\Delta t}$ is a digital value derived from said first temperature signal previously, $a_k$ is an ensemble of M nonzero coefficients of the numerical algorithm with $M \geq 2$, $b_k$ is an ensemble of N coefficients of the numerical algorithm with $N \geq 0$.

* * * * *